(12) United States Patent
Chandra et al.

(10) Patent No.: US 7,911,978 B1
(45) Date of Patent: *Mar. 22, 2011

(54) ADAPTIVE TOPOLOGY DISCOVERY IN COMMUNICATION NETWORKS

(75) Inventors: Ranveer Chandra, Ithaca, NY (US); Christof Fetzer, Chester, NJ (US); Karin Hogstedt, Chester, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/150,500

(22) Filed: Apr. 29, 2008

Related U.S. Application Data

(63) Continuation of application No. 10/452,708, filed on Jun. 2, 2003, now Pat. No. 7,366,113.

(60) Provisional application No. 60/436,692, filed on Dec. 27, 2002.

(51) Int. Cl.
*H04L 12/28* (2006.01)
*H04Q 7/24* (2006.01)
*H04J 3/26* (2006.01)

(52) U.S. Cl. ......... 370/255; 370/256; 370/338; 370/432

(58) Field of Classification Search .................. None
See application file for complete search history.

(56) References Cited

U.S. PATENT DOCUMENTS

| | | | | |
|---|---|---|---|---|
| 7,171,476 B2 * | 1/2007 | Maeda et al. | ................. | 709/227 |
| 7,184,421 B1 * | 2/2007 | Liu et al. | ...................... | 370/338 |
| 7,386,621 B1 * | 6/2008 | Hlasny | .......................... | 709/230 |
| 7,698,463 B2 * | 4/2010 | Ogier et al. | .................... | 709/242 |
| 2002/0101875 A1 * | 8/2002 | Lui et al. | ....................... | 370/402 |
| 2003/0117966 A1 * | 6/2003 | Chen | ............................ | 370/255 |
| 2003/0126299 A1 * | 7/2003 | Shah-Heydari | .............. | 709/252 |
| 2009/0103456 A1 * | 4/2009 | Herrmann et al. | ............ | 370/254 |

* cited by examiner

*Primary Examiner* — Seema S Rao
*Assistant Examiner* — Christine Duong
(74) *Attorney, Agent, or Firm* — Ronald D. Slusky

(57) ABSTRACT

A topology discovery process is used to discover all of the links in an ad hoc network and thereby ascertain the topology of the entire network. One of the nodes of the network, referred to as the coordinator, receives the topology information which can then be used to, for example, distribute a routing table to each other node of the network. The process has a Diffusion phase in which a k-resilient mesh, $k>1$, is created by propagating a topology request message through the network. Through this process, the nodes obtain information from which they are able to discern their local neighbor information. In a subsequent, Gathering phase, the local neighbor information is reported upstream from a node to its parents in the mesh and thence to the parents' parents and so forth back to the coordinator. The robustness of the Diffusion phase is enhanced by allowing a node to have more than one parent as well as by a number of techniques, including use of a so-called diffusion acknowledgement message. The robustness of the Gathering phase is enhanced by a number of techniques including the use of timeouts that ensure that a node will report its neighbor information upstream even if it never receives neighbor information from one or more downstream neighbors and the use of a panic mode that enhances the probability that a node will get its neighbor information, and its descendents' neighbor information, reported upstream even if that node has lost connectivity with all of its parents.

20 Claims, 7 Drawing Sheets

ADAPTIVE TOPOLOGY DISCOVERY IN COMMUNICATION NETWORKS

CROSS-REFERENCE TO RELATED APPLICATIONS

This is a continuation of U.S. patent application Ser. No. 10/452,708 filed Jun. 2, 2003 now U.S. Pat. No. 7,366,113, which claimed the benefit of U.S. Provisional Application No. 60/436,692 filed Dec. 27, 2002 entitled "Adaptive Topology Discovery in Hybrid Networks."

BACKGROUND OF THE INVENTION

The present invention relates to ad hoc networks.

Wireless networks are becoming increasingly popular in both office and home settings. Wireless networks are favored over wireline networks for many reasons. For example, they are easier to install in existing buildings and they provide users with the ability to move around while using their personal digital assistants (PDAs), laptops, etc. and still remain connected to the Internet and to each other.

One approach to wireless networking is via the use of a base station. In this approach, all nodes in the network communicate directly with the base station, which redirects the traffic to the destination node. There are several disadvantages to this approach. For example, a preexisting base-station-based infrastructure is not always available. In addition, the various devices in the network might be battery operated, and the desire to limit power consumption in such devices precludes long range communication.

Ad hoc networking can avoid such disadvantages. In an ad hoc network, the various devices, or "nodes," communicate directly which each other, on a peer-to-peer basis, over communication routes that are not fixed or predetermined. For example, the communication path between a pair of mobile devices in the network, such as two co-workers' PDAs, may initially be a direct, line-of-sight path when the devices are relatively close to one another. We refer to such a path as a local link. As the users move about the work facility, however, the broadcast power of the devices and/or obstructions to radio-frequency transmission within the environment may preclude such local-link communications. In that case, the communication route between the two PDAs may become a multi-link path involving a third device, such as a third employee's PDA, as an intermediary relay point.

One approach to routing messages in an ad hoc network is referred to as flooding. An originating node generates a message identifying the desired destination node. All nodes that receive the message rebroadcast it until, it is hoped, the desired destination node ultimately receives it. This approach is quite inefficient because of the inherent redundancy of the communications, giving rise to many message collisions, which in turn gives rise to many rebroadcasts and consumes the battery power of mobile devices that have only limited amounts of battery power to start with. A more refined approach involves each node learning the identities of the nodes with which it can communicate—its so-called neighbors—by exchanging messages designed for that purpose. The information generated at each node about its neighbors is propagated around the network so that, ultimately, an originating node is possessed of enough information so as to be able to identify some path through the network between itself and a desired destination and can address messages accordingly.

SUMMARY OF THE INVENTION

Either of the aforementioned approaches is generally effective insofar as it provides a mechanism by which the various devices in an ad hoc network are able to get messages delivered to one another. We have recognized, however, that improvements are possible by utilizing a process, known as topology discovery, that undertakes to discover all of the links in an ad hoc network and thereby ascertain the topology of the entire network. Given that knowledge, the routing of messages through the network can be made more efficient and/or various operating parameters improved upon, as compared to approaches such as those described above which are not based on a knowledge of the entire topology of the network. For example, when the topology of the entire network is known, it is possible to arrive at routings that seek to minimize the overall expenditure of battery power by, for example, minimizing the amount of radio-frequency energy needed to be expended by the various nodes to communicate within the network or routings that seek to minimize the average number of hops per path.

We refer herein to the process of attempting to discover all the links in a network as "exhaustive topology discovery." Exhaustive topology discovery is a technique that is already known and used in fixed networks. The reason, we believe, that it has not been thought to use exhaustive topology discovery in ad hoc networks arises directly out of the inherent limitations of many mobile devices. Because at least some of the devices in an ad hoc network are mobile, the topology itself is subject to continuous change and thus the topology discovery process would have to be continuously repeated, e.g., once per second or so. Each device in the network would thus be required to consume a significant amount of its battery power in continuously deriving the network topology. Moreover, the energy, processing and memory resources necessary to carry out topology discovery would have be possessed by every node in the network, making some otherwise low-cost devices, e.g., sensors, prohibitively expensive.

We believe that it is at least for the above reasons that workers in the art have had a mindset that has led them away from considering the possibility of using exhaustive topology discovery in ad hoc networks.

The present inventors, however, have recognized that exhaustive topology discovery in an ad hoc network is made feasible by virtue of the fact that most ad hoc networks are actually part of a larger network that includes both the ad hoc portion (or portions) and one or more fixed networks. We refer to such a combination as a "hybrid" network. A hybrid network typically includes at least one node that is not subject to some or any of the above-itemized limitations. That is, there is typically a node that has a great deal of battery power or is non-battery-powered and/or has a powerful enough processor and enough memory resources to shoulder the processing and storage burden to store the entire topology information. A desktop computer is such a node, for example. Once having discovered the overall network topology, this node, which we refer to as a "coordinator," can thereupon distribute a routing table to each other node of the network specifying only so much information as each particular node needs in order to route messages to the other nodes in the network.

An illustrative topology discovery protocol embodying the principles of the present invention has two phases. In the first, Diffusion phase, a topology request message is propagated from a node that has been selected as the coordinator. The various nodes in the network receive and rebroadcast a modified version of this message so that ultimately all nodes in the network have received the original message or the modified version. Through this process, the nodes obtain information from which they are able to discern their local neighbor information—meaning the nodes with whom they are able to communicate directly without an intermediary. Moreover, neighboring nodes establish parent/child relationships among themselves, with the possibility that a node may have more than one parent. In the second, Gathering phase, the local neighbor information is reported upstream from a node to its parents and thence to the parents' parents and so forth in a cascaded fashion all the way back to the coordinator. Together, the Diffusion and Gathering phases provide the coordinator with the topology information that it can then use to, for example, generate routing tables and distribute them to the various nodes of the network.

As a point of clarification, it is to be understood that the mesh that is built up by the nodes as described above is not the same thing as the topology of the network. The mesh is a construct defining a hierarchical relationship among the various nodes, i.e., the various parent/child relationships, and thereby defining pathways over which each node's neighbor information—the nodes with which it is able to communicate—can be robustly communicated to the coordinator. By contrast, the network topology is a description of which nodes of the overall hybrid network are able to communicate with which other nodes—its neighbors—apart from any considerations of which nodes are parents or children of which other nodes in the mesh. Thus a given node's neighbors not only includes all its parents and children but may also include nodes with which the given node can communicate that did not become one of its parents or children in the course of the creation of the mesh due, for example, to the fact that a node is limited to having k parents during the process of building the mesh.

A prior art arrangement referred to as Autonet utilizes a topology discovery protocol utilizing a diffusion phase followed by a gathering phase. See, for example, T. L. Rodeherrer and M. D. Schroeder, "Automatic reconfiguration in Autonet," *Proceedings 13th ACM SOSP, pp.* 183-197, October 1991. Similar to the present invention, the Autonet diffusion and gathering steps discover the topology of the network by constructing a directed graph, meaning that, for any pair of connected nodes, one node is regarded as the parent and the other as the child. However, Autonet utilizes a form of directed graph known as a spanning tree, which means that a node can have at most one parent. By contrast, in preferred embodiments of the present invention, the directed graph is a k-resilient mesh, meaning that a node can have as many as k parents, as previously noted. (A spanning tree, then, is a 1-resilient mesh.) The k-resilient mesh is acyclic, meaning that no path through the graph starts and ends on the same node—that is, there are no "loops" in the graph. Advantageously, using such a mesh structure allows for alternate routes by which a node can communicate its neighbor information to the coordinator, thereby increasing the resilience of the topology discovery protocol to the failure of links due to the mobility of the nodes.

In accordance with particular features of the invention, the robustness of the Diffusion phase is enhanced not only by allowing a node to have more than one parent, but by a number of techniques, including use of a so-called diffusion acknowledgement message. And in accordance with further particular features of the invention, the robustness of the Gathering phase is enhanced by a number of techniques including the use of timeouts that ensure that a node will report its neighbor information upstream even if it never receives neighbor information from one or more downstream neighbors and the use of a panic mode that enhances the probability that a node will get its neighbor information, and its descendents' neighbor information, reported upstream even if that node has lost connectivity with all of its parents.

Exhaustive topology discovery in a hybrid network pursuant to the principles of the present invention can be used to advantage beyond achieving efficient routing. For example, management of a sensor network or a relief operation requires the knowledge of connectivity of the nodes. The monitoring entity needs to learn of any areas in the network that are too dense or too sparse, as well as to learn about nodes that have no links to any other node. This knowledge can help the monitor make better use of resources in the system. Other potential applications include improved power management of the various devices' batteries, network visualization, and resource discovery.

DETAILED DESCRIPTION

Network Configuration

Figure 1:
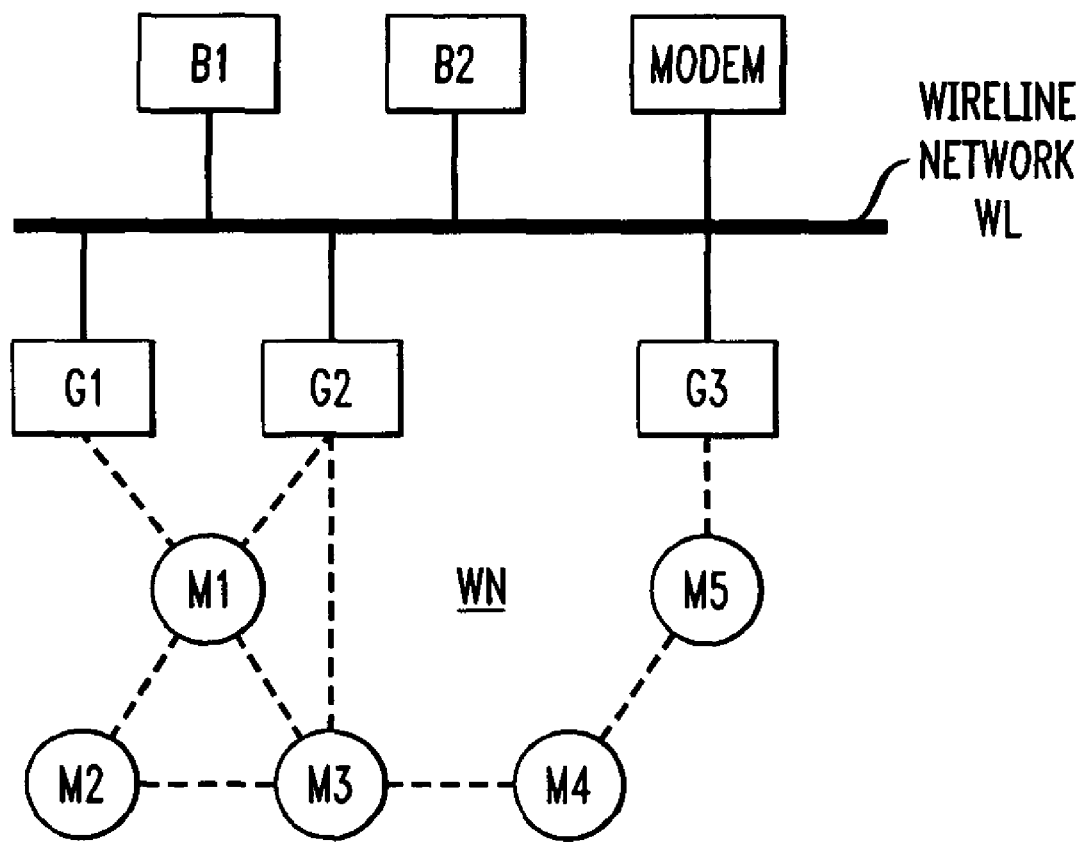
FIG. 1 shows an illustrative hybrid network in which a topology discovery protocol embodying the principles of the present invention is implemented.

The hybrid network of FIG. 1 comprises wireline network WL; ad hoc wireless network WN; wireline nodes B1 and B2; gateway nodes G1 through G3; and mobile nodes M1 through M5. Nodes B1 and B2 are connected only to wireline network WL. Nodes M1 through M5 are only connected to wireless network WN and nodes G1 through G3 are connected to the wireline and wireless networks. Wireline network WL may be, for example, an Ethernet network connected to the Internet via a broadband modem M, such as a cable modem or DSL modem. Nodes B1, B2 and G1 through G3 are illustratively desktop computers. Nodes M1 through M5 are illustratively laptop computers, PDAs, or other wireless devices that use the wireless network WN to communicate with each other and to access the Internet via wireline network WL. Some of the wireless devices may be mobile; others, such as sensors or door actuators/openers, may be fixed.

In the discussion that follows, nodes G1 through G3 and M1 through M5 will be referred to as wireless nodes. In particular, the gateway nodes provide routing functionality for all of the wireless nodes. A gateway node might be a wireless base station or an actual computing device, e.g., desktop computer. In either case, a gateway node may provide routing capability for other wireless networks in its neighborhood.

It is assumed that only a few nodes will move at any given point in time and that the speed of movement is very limited. The average speed of a moving node is expected to be limited by walking speed, which is about one meter/second. The execution time of one run of the topology discovery protocol to be described is relatively short, on the order of one second. The design of the topology discovery protocol thus assumes that the nodes comprising the network remain constant during that period.

The transport protocol for wireline network WL is illustratively TCP/IP. The transport protocol for the wireless network is illustratively 802.11 using Medium Access Control, or MAC, layer acknowledgements to detect and retransmit dropped packets, enabling a sender to detect if the transmission of a message has failed. Logically, the topology discovery protocol to be described is independent from the network layer, i.e., the routing layer, since in this embodiment the routing tables are computed using the topology provided by the topology discovery protocol.

Upon abstracting away the details of the MAC and network layer, we can assume the following communication model: Each node can send local unicast messages and broadcast messages. By local we mean that the message is not routed via intermediate nodes. An unicast message is a message addressed to a particular node with the communication following a procedure that involves the sending node first transmitting a request-to-send (RTS) communication to the receiving node. The receiving node thereupon responds with a clear-to-send (CTS) communication, at which point the sending node transmits the information desired to be communicated and the receiving node, upon receiving it, sends an acknowledgement (ACK). A broadcast message is a message intended to be read and potentially acted upon by any node that receives it. It is assumed that all messages are unique in the sense that, given a message, one can determine the sender, the destination, the send time, the receive time, and the acknowledgement time. Current MAC layers do not provide a robust local broadcast mechanism. However, such a mechanism is described hereinbelow.

As is characteristic of wireless protocols such as the 802.11 MAC layer, the links of the wireless network are bi-directional. That is, if a first node can receive messages from a second, then the second can receive messages from the first. As a matter of terminology herein, a node that is able to communicate with another node is said to be linked to that node. Each of the nodes contains the software necessary to participate in the topology discovery process. Messages involved in the topology discovery protocol will be addressed to a particular virtual port of the receiving node and then get "picked up" by the topology discovery software and operated on in the manner about to be described.

Topology Discovery Protocol

The network of FIG. 1 utilizes a topology discovery algorithm, or protocol, embodying the principles of the invention in order to carry out an exhaustive topology discovery of the network.

In summary, the protocol has two phases. The first, Diffusion phase, is initiated by a node that has been designated to be the coordinator, which broadcasts a topology request message. The coordinator may advantageously be chosen to be a node that has significant energy, processing and memory resources, such as a desktop computer. The various nodes in the network receive and rebroadcast a modified version of this message so that ultimately all nodes in the network have received the original message or the modified version. Through this process, the nodes obtain information from which they are able to discern their local neighbor information—meaning the nodes with whom they are able to communicate directly without an intermediary. Moreover, neighboring nodes establish parent/child relationships among themselves, with a node being allowed to have as many as k parents, where k is a selected parameter as described below. Thus the totality of the local neighbor information stored in the various nodes defines a k-resilient mesh spanning the complete network. The mesh information is then used in the second, Gathering phase, to forward the local neighbor information from all the nodes up to the coordinator. Together, these two phases provide the coordinator with the information that it can then use to determine the topology of the entire network on the basis of which it can then, for example, generate routing tables and distribute them to the various nodes of the network.

A point made earlier is worth being repeated here as a point of clarity for the reader, and that is the fact that the mesh is not the same thing as the topology of the network. The mesh is a construct defining a hierarchical relationship among the various nodes, i.e., the various parent/child relationships, and thereby defining pathways over which each node's neighbor information—the nodes with which it is able to communicate—can be robustly communicated to the coordinator. By contrast, the network topology is a description of which nodes of the overall hybrid network are able to communicate with which other nodes—its neighbors—apart from any considerations of which nodes are parents or children of which other nodes in the mesh. Thus a given node's neighbors not only includes all its parents and children but may also include nodes with which the given node can communicate that did not become one of its parents or children in the course of the creation of the mesh due, for example, to the fact that a node is limited to having k parents during the process of building the mesh.

Figure 2:
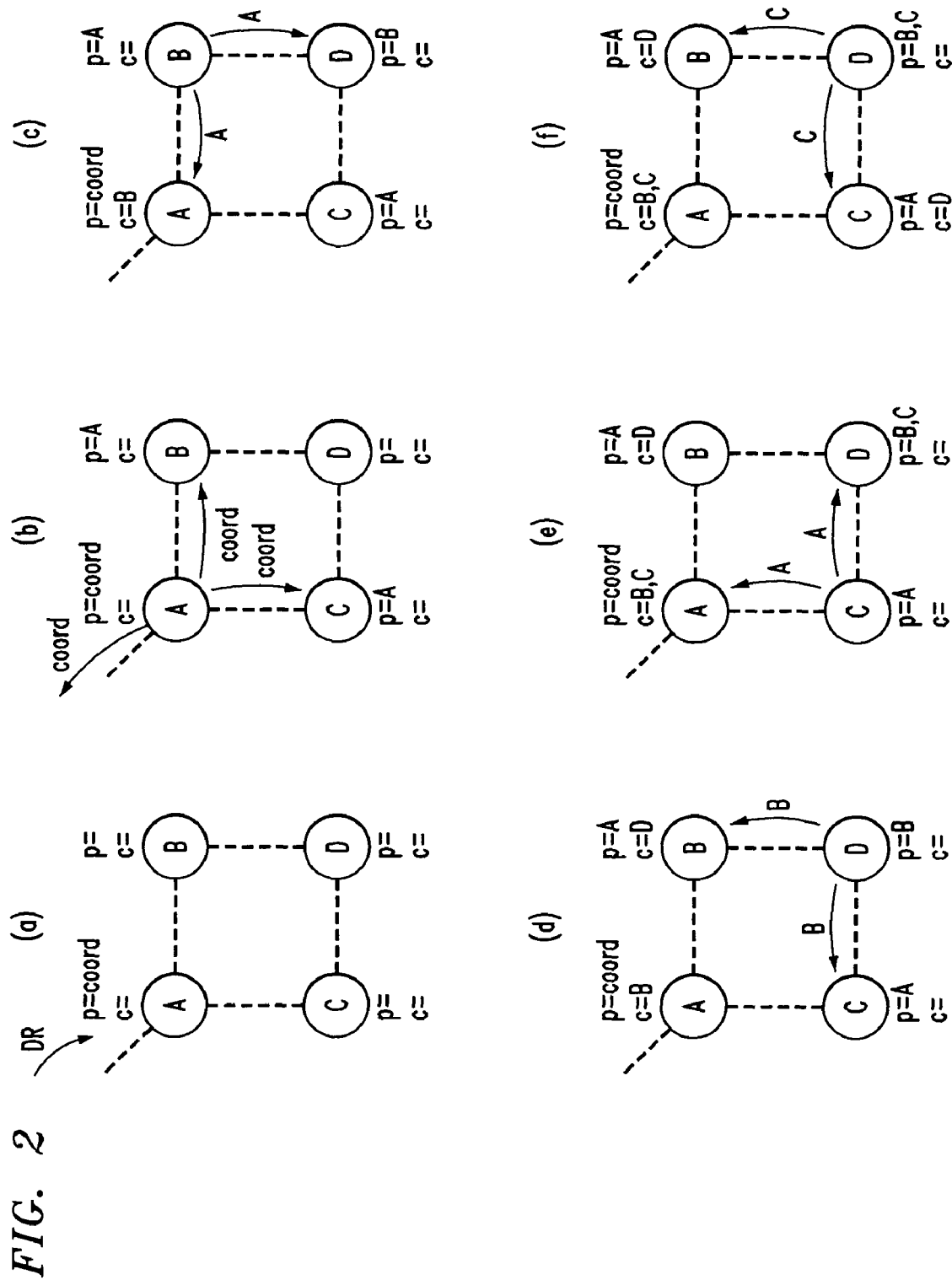
FIGS. 2(a) through 2(f) illustrate the Diffusion phase of the protocol.

FIG. 2 shows an example of the Diffusion phase. The example shows four nodes of the overall network, the nodes being labeled A, B, C and D. These can be any of the three types of nodes shown in FIG. 1. Thus although the links shown in FIG. 2 are all represented by dashed lines, some of those links may be wireline links, contrary to the drawing convention used in FIG. 1. Note, in particular, that there is no link connecting nodes A and D. This means that any message that is broadcast by either of those nodes is not received by the other because, for example, they are too far away from one another for a wireless link to exist between them. Similarly, there is no link between nodes B and C.

In addition to the four nodes shown in FIG. 2, the network of which they are a part includes at least one other node, not shown, that the network administrator has designated to be the coordinator. It is assumed that the only link between the coordinator and the nodes shown is a link between the coordinator and node A.

In the discussion that follows, only the basic outline of the Diffusion phase is described. A more detailed description of the diffusion phase appears later. This is also true of the Gathering phase example to be described in conjunction with FIG. 3

The object of the Diffusion phase is for each node to determine its own neighbors, i.e., the nodes with which it can directly communicate, as well as to establish its relationship with various ones of its neighbors as being that of parent or of child in order to define the k-resilient mesh. A node can not only have more than one child, but, as previously noted, it can also have more than one parent. The number of parents that a node can have is specified by the coordinator in its original message, as discussed more fully below. As also previously noted, allowing a node to have more than one parent increases the reliability of the algorithm by allowing for alternate routings through the mesh should a particular link fail or disappear.

The coordinator carries out the protocol repetitively, each repetition being referred to as a protocol run. It initiates any particular protocol run by broadcasting a topology discovery request, or DiffReq, message DR as shown in FIG. 2(a). This message is received by node A, which thereupon records the coordinator as its parent, as indicated by the notation "p[arent]=coord" in FIG. 2(a). Node A modifies the DiffReq message in various aspects as discussed below. For the present, it suffices to say that node A modifies the DiffReq message so as to indicate that the coordinator is the parent from which it received the DiffReq message. Node A then rebroadcasts the modified DiffReq message, which is received by nodes B and C, as shown in FIG. 2(b).

Node B then does what node A just did. Specifically, it records node A as its parent ("p=A"), modifies the DiffReq message to identify node A as the parent that sent the message, and then rebroadcasts the modified message. As indicated in FIG. 2(c), node B's broadcast is received by nodes A and D. Node A, seeing that it is listed in the message as a parent of the sending node B, knows that node B is its child and internally records that fact, as indicated by the notation "c[hild]=B" associated with node A. Node D, however, does what Nodes A and B had previously done. It records node B as its parent, as indicated by the notation "p=B" associated with node D, and modifies the DiffReq message to identify node B as the parent that sent it. Node D then rebroadcasts the message as modified. As indicated in FIG. 2(d), the message broadcasted by node D is received by nodes B and C. Node B, seeing that it is listed in the message as a parent of the sending node D, knows that node D is its child and internally records that fact, as indicated by the notation "c=D" associated with node B.

Node C, however, does not record node D as its parent because node C already has a parent that is closer to the coordinator—namely node A. The reason for this is discussed below. However, as indicated at FIG. 2(e), node C will have rebroadcasted the DiffReq message that it received from node A, per FIG. 2(b). That message is received by nodes A and D. Node A thereupon records node C as another one of its children ("c=B,C") and node D records node C as another one of its parents ("p=B,C").

Node D then rebroadcasts the DiffReq message it received from its second parent, node C. That message is received by nodes B and C, as indicated in FIG. 2(f). Node C, seeing itself listed in the message as node D's parent, records node D as its child ("c=D"). Node B already has node D recorded as its child and so does nothing further.

If contrary to the assumed example, a link existed between the coordinator and some node besides node A, the processing would have progressed along similar lines with those other nodes also recording the coordinator as a parent and the coordinator recording those nodes as its children.

Figure 3:
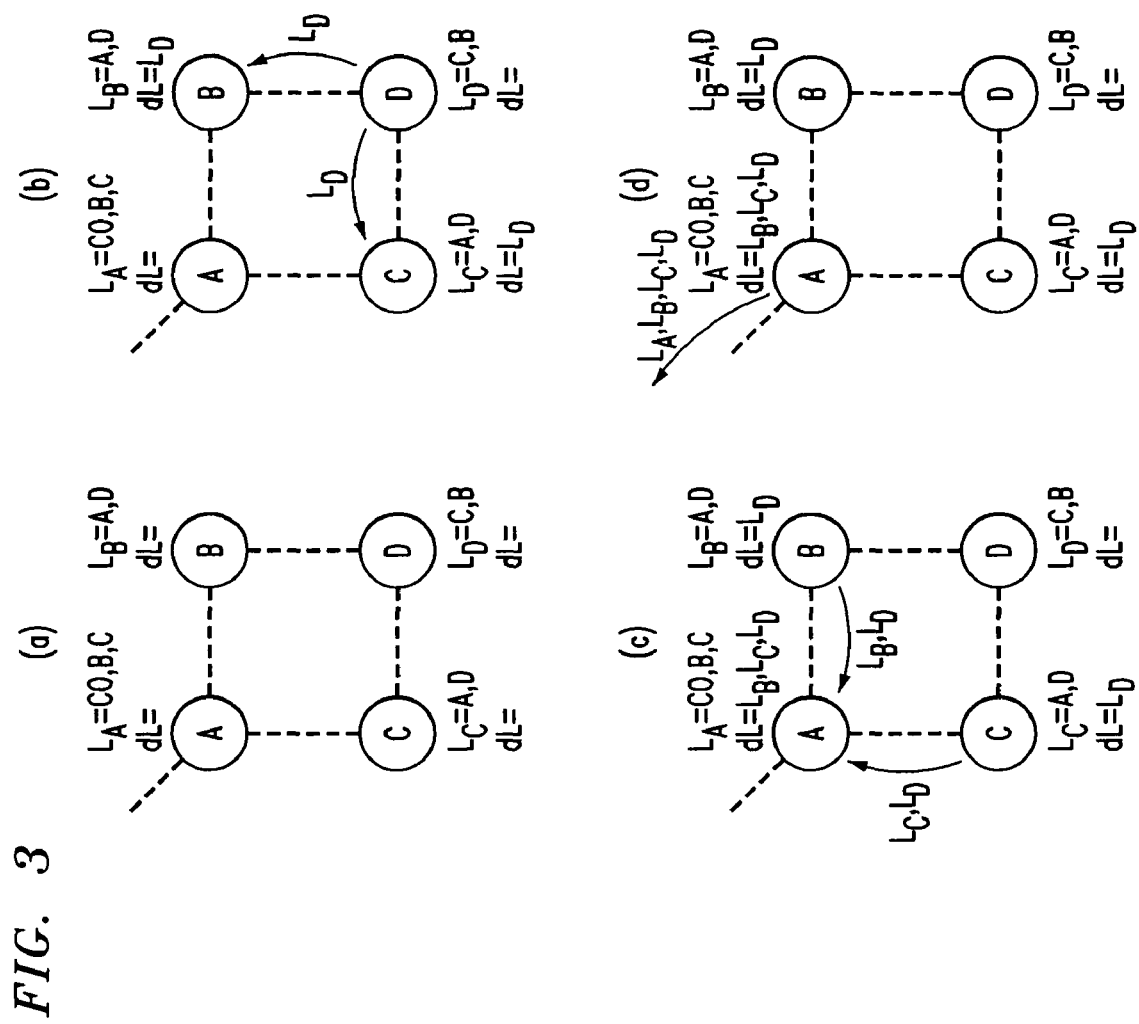
FIGS. 3(a) through 3(d) illustrate the Gathering phase of the protocol.

FIG. 3 depicts the Gathering phase for the portion of the network shown in FIG. 2. Notationally in FIG. 3, $L_i$ is the neighbor information of the $i^{th}$ node, where i={A,B,C,D}. At the start of the Gathering phase, as indicated at FIG. 3(a), the four nodes A, B, C and D will have each already learned their respective neighbor information in the Diffusion phase. In particular the neighbor information for node A, $L_A$, is the fact that node A has the coordinator as its parent and nodes B and C as its children. This is indicated notationally as "$L_A$=CO, B,C" where CO refers to the coordinator. The neighbor information for node B, $L_B$, is the fact that node B has node A as its parent and node D as its child ("$L_B$=A,D"), and so forth.

In the Gathering phase, each node uses a Gathering response, or GathResp, message to send upstream to all its parents its neighbor information and the neighbor information of its descendants (i.e., its children, their children, etc). This is carried out by the transmission of separate unicast messages to each of the parents. The unicast message is sent from a node to a particular parent a) as soon as the node has received the neighbor information from all its children, or b) a timeout period associated with that parent has expired, whichever occurs first. The duration of the timeout period is inversely related to the distance (measured in number of hops) between the parent in question and the coordinator. This scheme creates a cascade effect wherein nodes that have no children—the so-called leaves of the mesh—are the first nodes in their particular genealogical line to report their neighbor information upstream, followed by their parents, and then the parents' parents, and so forth. This upstream reporting mechanism is described in further detail below.

The timeout period that node D measures vis-à-vis its parents will be less than the timeout periods measured by the other nodes since node D's parents are further from the coordinator than any other nodes' parents. Moreover, node D has no children. Thus at the end of the timeout periods respectively associated with each of node D's parent nodes B and C, node D sends a GathResp message to that parent containing neighbor information $L_D$, as indicated at FIG. 3(b). The neighbor information $L_D$ is information indicating that nodes B and C are node D's parents. Notationally, $dL_i$ is used to represent the $i^{th}$ node's downstream neighbor information—that is the neighbor information possessed by its children and their children and so forth. Both nodes C and B have only one child, namely node D in each case. Thus $dL_C=L_D$ and $dL_B=L_D$.

In general, the nodes in a stable network will receive GathResp messages from all of their respective children prior to the expiration of any timeout periods being measured by a particular node. Assuming that to be the case here, node C, upon receiving $L_D$ from its only child uses a GathResp message to send its downstream neighbor information $dL_C=L_D$, as well as its own neighbor information $L_C$ to node C's parent, node A, as indicated at FIG. 3(c). Node B similarly sends $L_B$ and $L_C$ to its parent, which is also node A.

Node A's downstream neighbor information, denoted "$dL_A=L_B,L_C,L_D$" is then sent in a GathResp message by node A, along with its own neighbor information $L_A$ to node A's parent, the coordinator, as indicated at FIG. 3(d). The coordinator can then use the information that it receives about the entire network to devise routing tables or for any other desired purpose, as previously mentioned.

Figure 4:
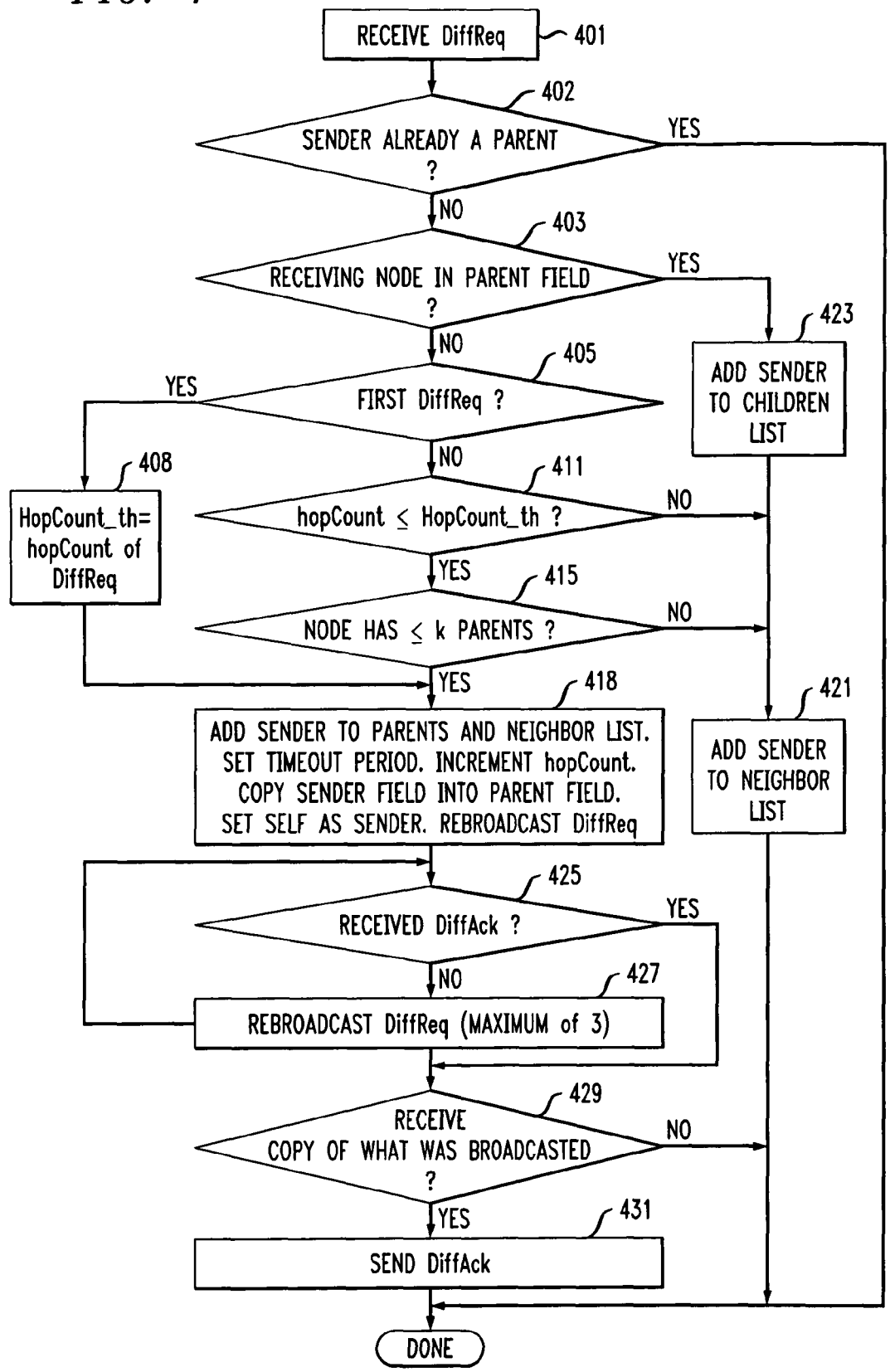
FIG. 4 is a flowchart of an illustrative implementation of the Diffusion phase.

FIG. 4 is a flowchart of the Diffusion phase of the protocol carried out by each node of the network during each protocol run. It is assumed that the user has already provisioned one of the nodes to be the coordinator by invoking a topology discovery set-up program within the node that was chosen to be the coordinator and setting an appropriate parameter indicating that that node is, indeed, the coordinator. The coordinator thereupon launches the Diffusion phase by broadcasting a first DiffReq message.

Table I(a) shows the fields of the DiffReq message.

TABLE I(a)

Fields of the DiffReq Message

| Field | Description |
| --- | --- |
| coord | the coordinator of the topology discovery |
| sender | the sender that broadcasted this message |
| parent | this message is a rebroadcast of a message received by this parent |
| hopCount | the distance, in hops, from coord to sender |
| k | maximum number of parents of a node |
| bcastId | a unique integer that identifies the current protocol run |
| maxEccentricity | the estimated maximum distance from any node to the coord |
| guardTime | a time period used by the coordinator to account for panic mode responses |
| powerLevel | transmission power to be used by the transport protocol |

In this first DiffReq message sent by the coordinator, the "coord" and "sender" fields both identify the coordinator. The identifiers of each node can be, for example, the unique ID possessed by wireless cards and/or their so-called MAC addresses. The "parent" field is null since the coordinator has no parents. The "hopCount" is 0, for the same reason. The value of "k" is illustratively chosen to be 2 or 3. The more parents a node is allowed to record for itself, the more robust will be the process by which the nodes get their neighbor information reported upstream to the coordinator. This is because various parents of a node may later "disappear" by virtue of their being carried elsewhere, for example. However, the more parents a node is allowed to have, the more complex and time-consuming the topology discovery process will be. Having k=2 or k=3 represents a good compromise among these competing considerations. The integer "bcastID" is illustratively incremented by "1" for each protocol run. The field "maxEccentricity" is a number that is set to a default value by the coordinator during the initial protocol run and is later updated as described below. A typical starting value might be "5". The field "guardTime" is used as discussed below. The field "powerLevel" is not actually used in the present embodiment. In other embodiments, however, it could be a value specified by the coordinator indicating to those nodes capable of transmitting at different power levels just what power level they ought to use. That power level could be determined by the coordinator based on the discovered topology.

The first step shown in the flowchart of FIG. 4, step 401, represents the receipt of a DiffReq message by a particular node. This node is referred to in the description of FIG. 4 as "the subject node." The DiffReq message will have been received by the subject node either from the coordinator or some other node that had rebroadcast a DiffReq message that that other node had received.

Table II shows the data structures built up at each node as the Diffusion phase, and later the Gathering phase, progresses.

TABLE II

Data Structures Kept at Each Node

| Data structure | Description |
| --- | --- |
| L | a list of discovered neighbors |
| Parents | a list of the parents of the node |
| Children | a list of the children of the node |
| dL | the accumulated neighbor information of the downstream nodes |
| HopCount_th | the hop count of the first parent in the Parents list of the node |

If, as determined at 402, the data structure kept at the subject node shows that the subject node has already recorded the sending node as a parent in the Parents list, nothing further is done vis-à-vis this particular received DiffReq message.

If, as determined at 403, the DiffReq message indicates that the subject node is the parent of the sending node—as will happen once a child node rebroadcasts a DiffReq message that it had received from its parent—then the subject node adds the sending node to its Children list and neighbor list L, as indicated at 423 and 421 and does nothing further. This is, for example, the situation depicted in FIG. 2(c) wherein node A receives such a message from node B.

The subject node will otherwise record the sending node as its parent in the Parents list if two criteria are met.

Firstly, in order to keep the mesh loop-free, a node receiving a DiffReq message records the sender as its parent only if the distance from the coordinator to the sending node (hop-Count field in the DiffReq message) is no greater than the distance from the coordinator to the node from which the subject node received its first DiffReq message (Hop-Count_th maintained at the subject node). It was for this reason that node C did not record node D as its parent in FIG. 2(d). If this is, in fact, the first DiffReq message the subject node has received, as determined at 405, then the subject node sets HopCount_th=hopCount at 408. Otherwise, Hop-Count_th and hopCount are compared at 411 to determine if the hopCount<HopCount_th. If not, the sender is disqualified from being a parent of the subject node. The sender is also disqualified from being a parent of the subject node if the latter already has k parents, as determined at 415. In either case, the sending node is simply added to the subject node's neighbor list L at 421.

If the sending node has not been disqualified from being a parent for the subject node, a number of operations are performed at 418. Firstly, the sender is, in fact, recorded in the Parents list as a parent of the subject node and also in the neighbor list L. The subject node starts a timer in order to measure the aforementioned timeout period associated with this particular parent. The subject node generates a modified version of the DiffReq message by incrementing hopCount, copying the sender field into the parent field, and setting itself in the sender field. The other fields are not changed from the values that were set by the coordinator. The subject node then rebroadcasts the message, meaning that it broadcasts the DiffReq message as modified.

As indicated at 425 and 427, the node rebroadcasts the DiffReq message some number of additional times, illustratively three times, until it receives a message referred to herein as a DiffAck message, the fields of which are shown in Table I(b).

TABLE I(b)

Fields of the DiffAck message

| Field | Description |
| --- | --- |
| sender | the node sending this DiffAck message |
| dest | the sender field of the DiffReq being acknowledged |
| coord | the coord field of the DiffReq being acknowledged |
| bcastId | the bcastId field of the DiffReq being acknowledged |

The role of the DiffAck message can be understood by considering that the success of the Diffusion phase depends on the reliability of the broadcasts. If many broadcasts fail, fewer links are discovered. Broadcasts in most MACs for ad hoc networks are not reliable. Indeed, in the 802.11 protocol, for example, broadcasts are sent whenever the carrier is sensed free and this can result in a number of collisions. In particular, as transmission power, and therefore neighbor density, are increased, more broadcast messages collide, increasing the possibility that a smaller fraction of the links will be discovered.

In order to increase broadcast reliability, the topology discovery protocol causes the subject node, after rebroadcasting the DiffReq message at 418, to wait for the receipt of the DiffAck (Diffusion acknowledgement) message unicast from the node that originated the DiffReq message that the subject node is now rebroadcasting. We have found that this scheme adds a lot of robustness to the Diffusion phase, making it much more likely that all the links of the network will be discovered.

Nodes are, of course, also responsible for sending DiffAck messages. In particular, as indicated at 429 and 431, the subject node unicasts the DiffAck message upon receiving a copy of what it had itself broadcast at 418. Thus in the FIG. 2 example, once node A has sent out its DiffReq message (FIG. 2(b)) and thereafter receives node B's rebroadcasted copy (FIG. 2(c)), node A sends the DiffAck message that node B was waiting for (this not being shown in FIG. 2). If for any reason node B does not receive the DiffAck message, it will send the DiffReq message again.

We consider now the Gathering phase which, as was seen in the example of FIG. 3, proceeds in a cascade from the leaves of the mesh in an upstream direction toward the coordinator. That is, nodes that have no children (the leaves) will begin unicasting their neighbor information upstream to their parents before their parents begin unicasting their own neighbor information upstream to the parents' parents, and so on. This cascaded reporting is orchestrated by judicious selection of the timeout periods, as discussed below. Barring an actual communication failure, a node will generally have received a GathResp message from all its children before any of its timeout periods have expired. Once having received a GathResp message from each of its children, a node thereupon unicasts GathResp messages to each of that node's parents. If a node hasn't heard from all its children by the time a timeout period established for a particular one of the node's parents has expired, the node will send to the parent in question whatever neighbor information the node has at that time. Ultimately, all topology information sent upstream makes its way to the coordinator.

Figure 5:
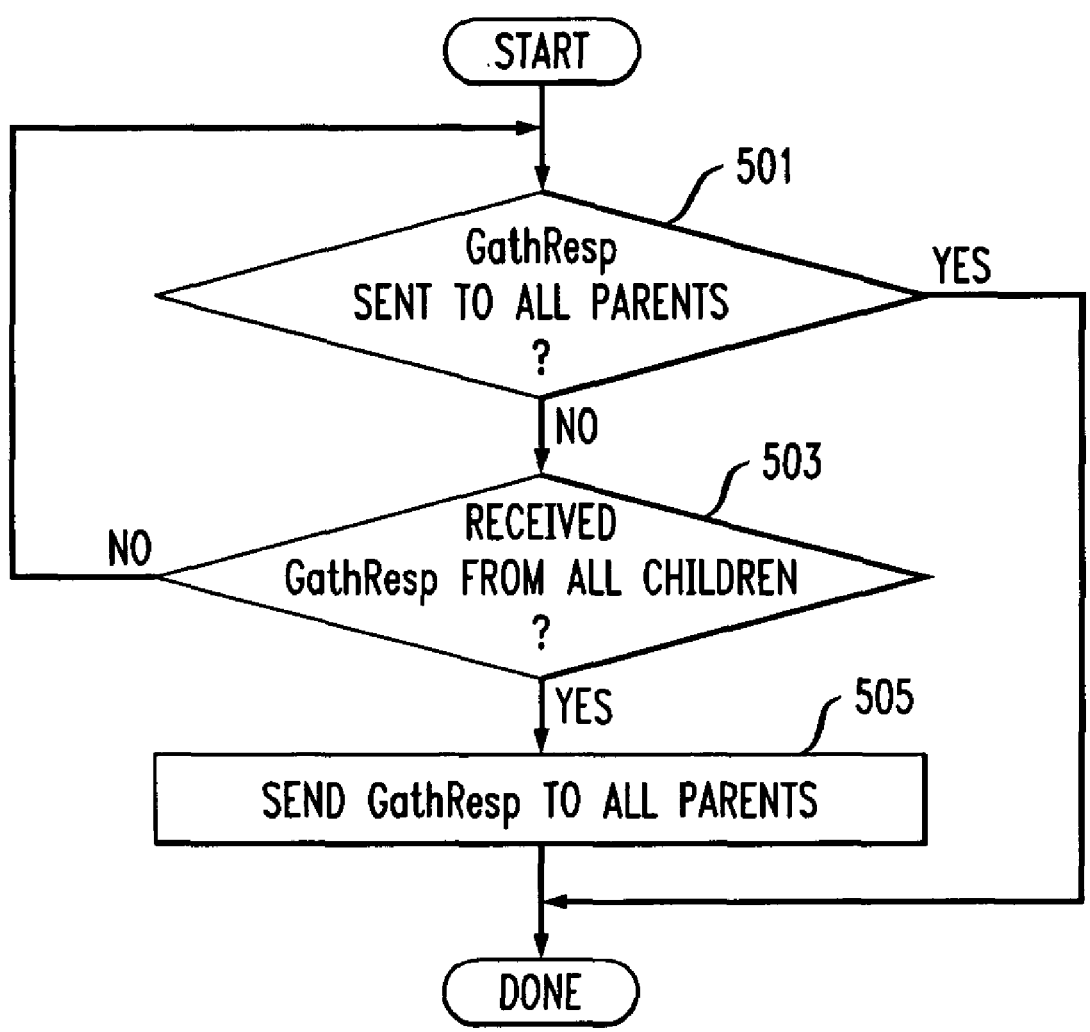
FIGS. 5 and 6 are flowcharts of an illustrative implementation of the Gathering phase.
Figure 6:
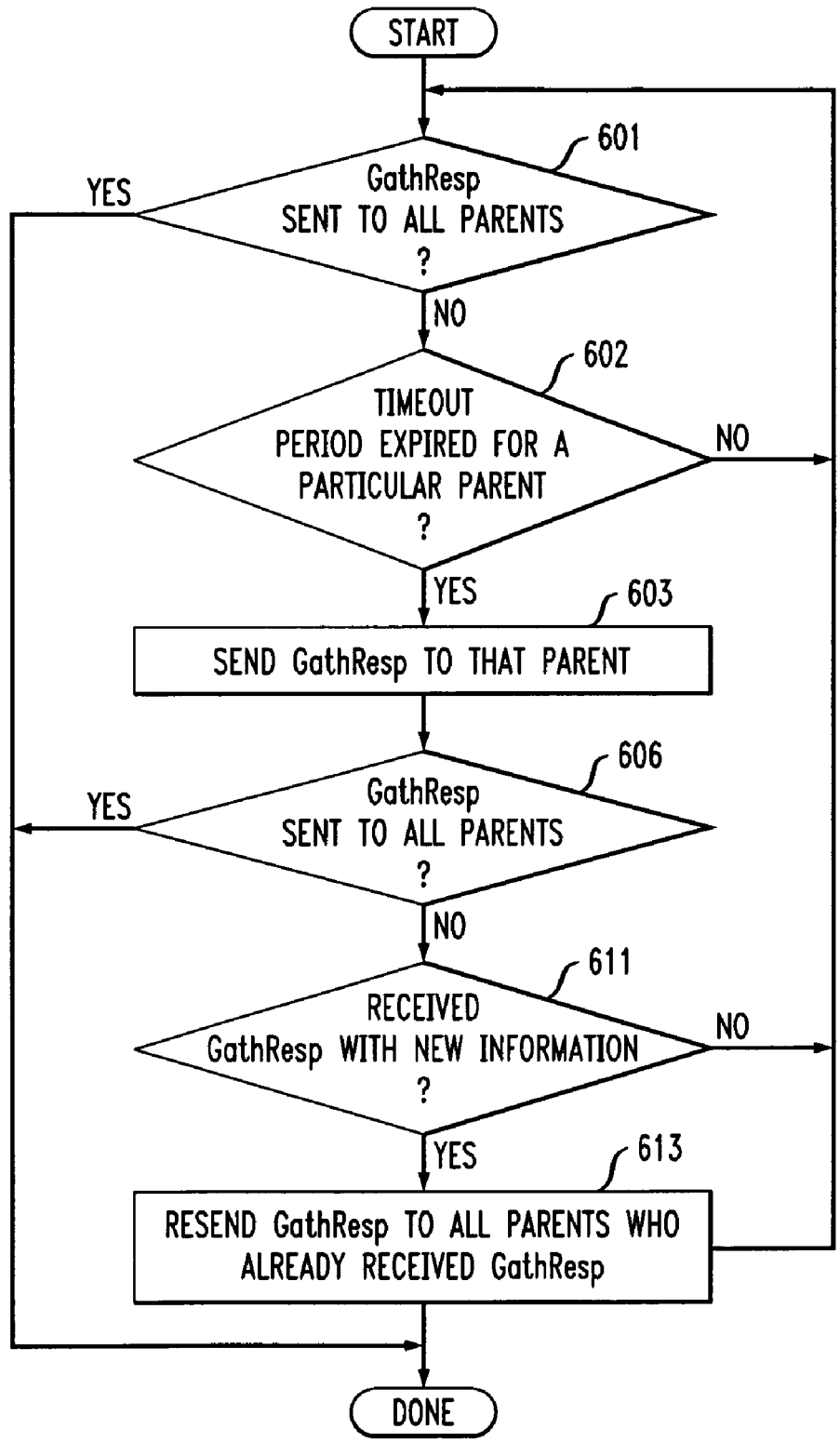

The flowcharts of FIGS. 5 and 6 depict the logic and processing that implement the Gathering phase as just summarized. The processing represented in the two flowcharts is carried out by each node of the network, except for the coordinator, during each protocol run, that node being referred to in the description of FIGS. 5 and 6 as "the subject node."

GathResp messages are sent from the subject node to its parent(s) under one of two situations. FIG. 5 covers the first situation, wherein the subject node has at least one child (i.e., is not a leaf of the mesh) and receives GathResp messages from all of its children before any of the aforementioned timeout periods have expired. This is the typical mode of operation for non-leaf nodes in a network that is stable. FIG. 6 depicts the case where GathResp messages are transmitted under the control of the timeout mechanism either because the subject node has no children or because one or more children did not report upstream, i.e., send a GathResp message to the subject node, prior to the timeout period.

The processes of FIGS. 5 and 6 are interrelated. In particular, while the subject node has been waiting for GathResp messages from all its children per the operations set forth in FIG. 5, the process of FIG. 6 may have already caused a GathResp message to have been sent to all parents. If this is in fact the case, as determined at 501, there is nothing more for the subject node to do during this Gathering phase and the FIG. 5 process is done. Otherwise, it is determined at 503 whether the subject node has now heard from all of its children. If so, a GathResp message is sent to each parent, as indicated at 505 and, again, the process is done.

Table I(c) shows the fields of the GathResp message.

TABLE I(c)

Fields of the GathResp Message

| Field | Description |
| --- | --- |
| sender | the sender of this message |
| coord | the coordinator |
| bcastId | a unique integer that identifies the current protocol run |

TABLE I(c)-continued

Fields of the GathResp Message

| Field | Description |
| --- | --- |
| topoInfo | the accumulated topology information from the sender and the downstream nodes |
| eccentricity | the maximum distance from any downstream node to the coord |
| panicmode | set to true iff sender is in panic mode |

The "topoInfo" field in the GathResp message contains the subject node's own neighbor information, including a list of its parents and children (L, Parents and Children data structures) and further includes the downstream topology information dL contained in the topoInfo field in the GathResp messages received from the subject node's children. Only GathResp messages having the same value of "bcastID" as was contained in the most-recently-received DiffReq message are considered, in order to preclude the reporting of stale information upstream. Neighbor information includes not only parents and children but any other node that transmitted any message that was heard by the subject node. This may include, for example, nodes that were disqualified from being parents of the subject node during the Diffusion phase. It may also include other non-parent/non-child nodes whose DiffReq, DiffAck or GathResp messages happen to have reached the subject node. The value of "eccentricity" is the maximum value of "eccentricity" contained in any of the GathResp messages received from the subject node's children. (The typical application of the present invention will be in networks that are relatively sparse, meaning that each node is linked to a relatively small number of other nodes. As a result, the information in the topoInfo field is represented by a so-called adjacency list, which is a more efficient representation for sparse networks than, for example, a bitfield representation would be. The L and dL data structures at the nodes shown in Table II are also represented by adjacency lists.)

If, as determined at 503, the subject node did not hear from all of its children, the possibility that all parents have now been sent a GathResp message by the timeout process of FIG. 6 is again checked at 501, and the process of FIG. 5 continues until one or the other of the FIG. 5 and FIG. 6 processes has caused a GathResp message to be sent to all parents of the subject node.

As will be clear from the foregoing, the process of FIG. 6 proceeds concurrent with the subject node waiting to hear from all its children, per the process of FIG. 5. The FIG. 6 process had begun as soon as the first DiffReq message from a parent had been received because that is when the timeout period for that parent had begun to be measured. If at any point in time the process of FIG. 5 has caused a GathResp message to be sent to all parents, as determined at 601, there is nothing more for the subject node to do during this Gathering phase and the FIG. 6 process is done. Otherwise, it is determined at 602 whether the timeout period associated with any particular parent has expired. If not, the process continues to wait until that happens or until the process of FIG. 5 has caused a GathResp message to be sent to all parents as again determined at 601.

If, however, it is determined at 602 that the timeout period associated with a particular parent did expire, a GathResp message is sent to that particular parent, as indicated at 603. This is, in fact, always the mechanism by which a node having no children sends its GathResp messages to each of its parents. Moreover, as already noted, the timeout periods employed at each node are such that nodes that have no children (the leaves of the mesh) will begin sending their neighbor information upstream to their parents before their parents begin unicasting their own neighbor information upstream to the parents' parents, and so forth.

If, as determined at 606, the parent that received a GathResp message at 603 was the last parent in the Parents list to receive one, the process is done. Otherwise, it is determined at 611 whether a GathResp message with new topoInfo information has been received. This may happen, for example, because a child's message was unduly delayed for some reason and hadn't been received by the subject node before the relevant timeout period had expired. Or a child may have received updated neighbor information from one or more of its children and so had sent a new GathResp message upstream to the subject node. Since not all parents on the Parents list have been sent a GathResp message, the subject node will resend a GathResp containing the new information to all parents to whom a GathResp has already been sent, as indicated at 613. Otherwise, the new information is ignored because making provision to send new information once a GathResp has been sent to all the subject node's parents would unduly increase the message complexity. The process then returns to 601.

In a stable network, the neighbor information $dL_i$ in a GathResp message contains the complete neighbor information for all downstream nodes. Thus upon receiving a GathResp message from each of its children, the coordinator has access to the complete topology information. The coordinator illustratively thereafter carries out such steps as sorting out all of the neighbor information that it has received, much of which may be redundant, to build an image of the overall network topology; creating routing tables that define a path through the network from each node to each other node; and disseminating the appropriate routing information to the various nodes. For example, the coordinator could transmit to each of its child nodes a routing table for both that node and its children. The node receiving this information could then strip out its own routing information and then send the rest of the information on to its children.

Algorithms and techniques for generating the routing tables based on a knowledge of the topology are well known in the art and need not be described in further detail herein. In general, the process of determining a route for communications between any two nodes will favor routes that involve the fewest number of hops between those nodes. Indeed, that might be the sole criterion used during the first protocol run. For subsequent protocol runs, the routing table generation process could iteratively improve overall performance of the network by taking other factors into account and modifying the routing tables accordingly. For example, the routing plan may favor routes involving hops that are stable, i.e., links within the network that have persisted over a large number of protocol runs. It may also take into account such factors as the various nodes' current level of battery charge or resource limitations, this being information that could be supplied by the nodes themselves in various messages directed to the coordinator or included in the GathResp messages.

As previously noted, a new protocol run is initiated on a periodic basis, such as once per second. Thus if there have been any changes to the network topology, including the appearance of new nodes or links or the disappearance of nodes or links previously in the network, those changes can be quickly ascertained and the topology updated accordingly.

Stability Considerations

The protocol described above works as long as the mesh structure consists of stable links. An unstable link can cause a parent to wait for a GathResp message from its child, although the child might never be able to send it successfully. This problem is more serious in meshes with a lower resiliency factor, k, i.e., the number of parents that a node is allowed to have. In a 1-resilient mesh, i.e., a mesh in which a node is allowed to have only one parent, one unstable link can prevent the downstream neighbor information from reaching the coordinator. However, a mesh with a resiliency factor greater than one will be able to tolerate some unstable links if alternate paths exist from the nodes to the coordinator. The way in which the topology discovery process tolerates unstable links is now described.

A parent should not wait for an unbounded amount of time for the reply of a child since a reply might never be received, e.g., due to a link that failed or due to the failure of a downstream node. As already noted, the parent should instead time out after a bounded amount of time to make sure that it forwards its own neighbor information and that of its other children that it has received so far. The time out period has to be chosen carefully. If the time-out is too short, some topology information might never be forwarded to the coordinator. This results from the fact that a GathResp message is sent by a node to a parent only once. Thus any further downstream information that arrives at the node thereafter is not communicated to that particular parent. That is, once the timeout period for a given parent has expired and a GathResp message containing whatever downstream information has been received is sent to that parent, any later-arriving information will not be sent to that parent. This is necessary because if the information is not ignored and the timeout period is too short, the message complexity necessary to handle such eventualities would increase unacceptably. If the timeout period is too long, the topology information might become stale. Because nodes in the network are mobile, some discovered links might for example become disconnected and some new links might appear before the information is forwarded to the coordinator.

As noted earlier, the timeout periods of the nodes are cascaded. Ideally, a child times-out exactly Δ time units before its parent times out to make sure that the child has sufficient time to send its current topology information to its parent before the parent stops waiting and reports whatever topology information it has in hand to its parents. To this end, the timeout period is set such that after receiving the DiffReq from its $i^{th}$ parent, a child waits for a timeout period associated with that parent given by $2*(ecc-d_{P_i}+1)*\Delta$, where ecc is the eccentricity with respect to the coordinator, i.e., the maximum distance from the coordinator to any node in the network. The actual maximum eccentricity at a given point in time is learned by the coordinator from the value of the "eccentricity" field included in the GathResp messages the coordinator receives from its children. The coordinator uses this value to determine a value for the field "maxEccentricity" in the DiffReq message supplied to the nodes during the next protocol run. The nodes use the value of "maxEccentricity" to be the value of ecc. The value of "maxEccentricity" is chosen by the coordinator to be slightly larger than the maximum eccentricity that actually existed during the previous protocol run. This is done in order to take into account the possibility that the maximum eccentricity during the present protocol run is larger than before due to the movement of nodes or the appearance of new nodes. Augmenting the actual maximum eccentricity by "2" would be typical. Thus if the maximum eccentricity of the network as learned by the coordinator from its received GathResp messages is "3", then the coordinator would set maxEccentricity to "5" for the next protocol run. The value used for maxEccentricity during the first protocol run may depend on the anticipated size of the network; a home network would be expected to be much smaller than a corporate network. As noted earlier, a typical starting value for "maxEccentricity" might be "5". The value of $dp_i$ is the value of hopCount that was contained in the DiffReq message first received from that parent. The value of the constant, A, is the time-out delay for unicast messages, i.e., the time after which a sender gives up retransmitting a non-acknowledged unicast message. Illustratively, $\Delta$=10 ms. As previously noted, the child will initiate a GathResp directed to a particular parent when all its children have replied or when its timeout for that parent has expired, in which case is sends to the parent all the information is has available.

The protocol will gather all link information as long as each node has at least one stable link to a parent during the Gathering phase. Since the response is sent without much delay and the nodes in a home or office network are not expected to move at high speeds, the mesh will usually stay stable enough for the Gathering phase to succeed. However, in a rare situation a node in the mesh might displace itself fast enough to become disconnected from all its parents such that none of the parents are reachable during the Gathering phase. A node will know that it could not reach a particular parent if the node did not receive both a clear-to-send (CTS) and an ACK from the parent in question pursuant to the unicast procedure mentioned above, this being referred to as a "lost message." The support provided by the protocol for these uncommon scenarios is as follows:

It is possible that a node is unable to send the GathResp message to any of its parents, either because the Parents list has become empty as a result of all of its parents going into panic mode or because the node receives no acknowledgement in response to its unicast GathResp messages. If a node's parents prove to be unreachable, the node then enters a panic mode. In panic mode, the node broadcasts the GathResp message to all its neighbors, as determined during the Diffusion phase, with its "panicmode" field set to TRUE.

A GathResp message received by a child from a parent in panic mode causes the parent to be removed from the Parents list (Table II) maintained by the child. For example, suppose node $W_i$ is the parent of node $W_j$. If node $W_i$ enters panic mode, then node $W_j$ should not rely on successful communication of its GathResp to node $W_i$ since node $W_i$ might still not be able to send the message any further. So, node $W_j$ removes node $W_i$ from its Parents list and enters a panic mode if this list becomes empty.

Figure 7:
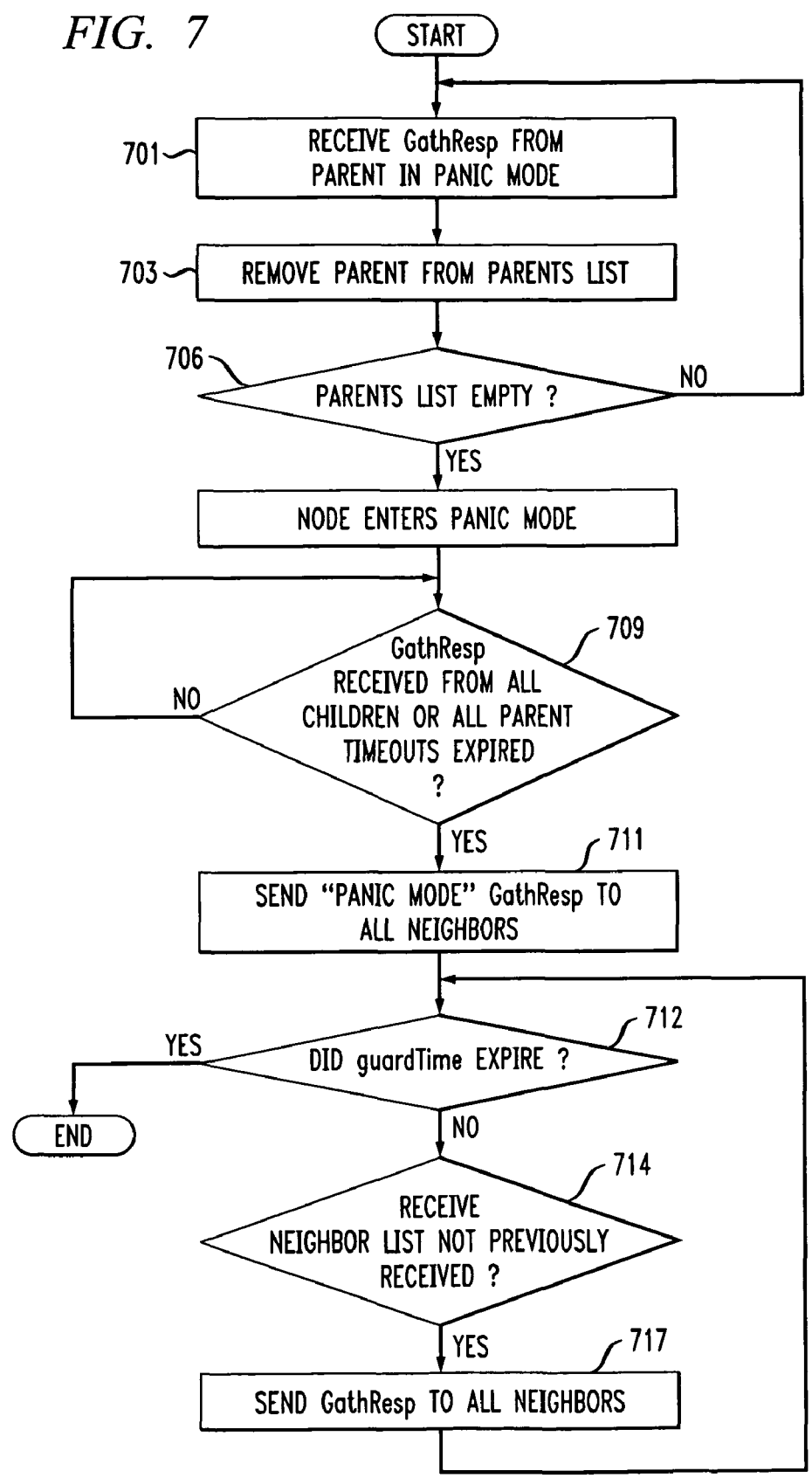
FIG. 7 is a flowchart of processing carried out in the Gathering phase when at least one node has entered a panic mode.

The processing associated with one or more nodes entering panic mode as just described is shown in FIG. 7. In particular, if the subject node receives a GathResp message from a parent in panic mode, as indicated at 701, the subject node removes that parent from its parent list, as indicated at 703. If the Parents list is not then empty, as determined at 706, the subject node does nothing further. If, however, the Parents list has become empty, then once the subject node has received GathResp messages from all its children or the node has waited for all the timeout periods that it was timing to expire, as indicated at 709, it unicasts the GathResp message to each of its neighbors, as indicated at 711. If the node is unable to get a unicast message delivered to any of its neighbors, which it will know is the case if all of its unicast messages to the neighbors were lost, it might still be able to get its message sent upstream if it broadcasts it because other nodes not previously known to be neighbors may have come within communication range. Such a process is also encompassed by the processing at 711. In particular in this case, a robust MAC broadcast is used in which the data, or payload, contains an explicit request-to-send (RTS) identifying the last node from which any message was heard or received and to which a unicast message has not already been attempted. If the node thus identified responds with a broadcast of its own which includes a clear-to-send (CTS), this means that traffic in the local medium is sufficiently sparse at that exact time that it may be possible for the transmitting node to get its information communicated and it thereupon broadcasts its GathResp message in the expectation that either the node that just responded or possibly some other node will receive it. If no CTS was received, the node may try this with the next-to-last neighbor node from whom any message was heard or received and with which communication has not yet been attempted and so forth. The sending node illustratively attempts this mode of getting its information upstream three times for each node that it knows about. To reduce the size of this broadcast, complete neighbor information (i.e., information about which nodes can communicate with which other nodes) is not sent but rather only information identifying the nodes. The reason for this is that if all the neighbors of a node have failed, then it is presumed that its link information is not of any use to the coordinator.

Continuing with the processing of FIG. 7, the node in panic mode may subsequently receive a neighbor list it has not received previously. That neighbor information may or may not come too late, however, for the coordinator to use. In particular, the coordinator has identified to all nodes, in the field guardTime of the DiffReq message, a time period that it will wait after it expects it will have received all downstream information in the course of a normal protocol run (i.e., a run in which no nodes have entered panic mode.) If, as determined at 712, a time period greater than guardTime has expired since the final parent timeout expired, the processing of FIG. 7 ends. Otherwise, if the node now receives a not-previously-received neighbor list, as determined at 714, it attempts to transmit a GathResp message with the new information to all its neighbors, as indicated at 717, using any one or more of the mechanisms described above.

The foregoing is only illustrative of the invention and its possible uses and contexts and many variations will be apparent to those skilled in the art.

For example, the coordinator-rooted mesh spanning across the entire network resulting from the Diffusion phase of the protocol can be used for any kind of data gathering application, and it is not in anyway dependent on the topology discovery application, i.e., the process of learning all the links among the various nodes. For example, knowledge of the mesh can also be used in applications such as determining the power usage or in any kind of data aggregation in a sensor network.

In the present illustrative embodiment, the coordinator is chosen by a person. In a more fully automated system, however, an election process or some other mechanism could be used whereby the various nodes decide among themselves which one ought to be the coordinator. It is also possible that the coordinator function could be distributed and the various coordinators would then coordinate amongst themselves.

Once having learned the topology, the coordinator could use that knowledge to optimize the topology discovery process during the next protocol run.

The topology discovered during each protocol run can be thought of as a "snapshot" of the network at a particular point in time. By comparing successive snapshots, the coordinator can determine what within the network is stable and what is not. For example, if a printer cable for a printer connected as one of the nodes in the network became disconnected, this fact could be detected.

Our invention is also described in our published paper, hereby incorporated by reference, Ranveer Chandra, Christof Fetzer and Karin Hogstedt, "A Mesh based Robust Topology Discovery Algorithm for Hybrid Wireless Networks", *Proceedings of Informatics*, 1st *International Conference on Ad-hoc Networks and Wireless*, Toronto, Vol. 16, pp 1-16, Sep. 20-22, 2002.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

In the flowcharts hereof, the various boxes are intended to represent not only process or method steps, but also, alternatively, modules of program code, stored on a computer-readable medium which, when executed by a processor, cause the processor to carry out the functions necessary to effectuate the operations associated with the respective box(es) of the flowchart.

It will thus be appreciated that although the invention is illustrated herein in the context of a particular illustrative embodiment, those skilled in the art will be able to devise numerous other arrangements not shown or described herein that nonetheless embody the principles of the invention.

The invention claimed is:

1. A method carried out by a plurality of nodes of a communication network at least a portion of which is an ad hoc network in which at least some messages are communicated between originating nodes and destination nodes a without being routed via any intermediate nodes, the method comprising
    carrying out an exhaustive topology discovery of at least a portion of said ad hoc network, said exhaustive topology discovery comprising discovering all of the nodes of said ad hoc network and all of the links between each pair of such nodes, there being a link between a pair of node whenever each node of that pair of nodes is able to receive messages from the other, said discovering including an exchange of messages among at least ones of said plurality of nodes, and
    collecting, by an individual one of the nodes of the communication network, information identifying all of the discovered nodes and all of the discovered links,
    wherein said discovering comprising a diffusion phase and a subsequent gathering phase and wherein said diffusion base includes crea ion of a k-resilient mesh, k>1, in which parent-child relationships are defined among two or more of the nodes of the communication network and wherein at least one of those nodes has k parents.

2. The method of claim 1 wherein two or more of said discovered links are wireless links.

3. The method of claim 2 wherein said individual one of the nodes of the communication network is a non-battery-powered node.

4. A method carried out by a plurality of nodes of a communication network at least a portion of which is an ad hoc network in which at least some messages are communicated between originating nodes and destination nodes without being routed via any intermediate nodes, the method comprising
    carrying out an exhaustive topology discovery of at least a portion of said ad hoc network, said exhaustive topology discovery comprising discovering all of the nodes of said ad hoc network and all of the links between each air of such node there being a link between a pair of nodes whenever each node of that air of nodes is able to receive messages from the other, said discovering exchange of messages among at least ones of said plurality of nodes, and
    collecting, by an individual one of the nodes of the communication network, information identifying all of the disc vere nodes and all of the discovered links,
    wherein said discovering comprises a diffusion phase and a subsequent gathering phase and wherein said diffusion phase includes creation of a mesh in which parent-child relationships are defined among two or more of the nodes of the communication network and wherein at least one of those nodes has at least two parents.

5. The method of claim 1 wherein in said gathering phase each node having a parent in said k-resilient mesh reports to each of its parents a) information identifying all of the nodes with which said each node is linked and b) information received from any child of said each node identifying all of the nodes with which that child is linked.

6. A method carried out by a plurality of nodes of a communication network at least a portion of which is an ad hoc network in which at least some messages are communicated between originating nodes and destination nodes without being routed via any intermediate nodes, the method comprising
    carrying out an exhaustive topology discovery of at least a portion of said ad hoc network, said exhaustive topology discovery comprising discovering all of the nodes of said ad hoc network and all of the links between each pair of such nodes, there being a link between a pair of nodes whenever each node of that pair of nodes is able to receive messages from the other, said discovering including an exchange of messages among at least ones of said plurality of nodes, and
    collecting, by an individual one of the nodes of the communication network, information identifying all of the discovered nodes and all of the discovered links
    wherein said discovering comprises a diffusion phase and a subsequent gathering phase and wherein said diffusion phase comprises
    a) a first one of the nodes of said communication network broadcasting a topology discovery request,
    b) each of second nodes that receive said topology discovery request recording said first node as its parent and broadcasting said topology discovery request modified to identify said first node as its parent,
    c) each of third nodes that did not receive the topology discovery request broadcasted by the first node but did receive a modified version thereof broadcasted by one of said second nodes,
        i) recording that one of said second nodes as its parent and
        ii) broadcasting said topology discovery request modified to identify said one of said second nodes as its parent.

7. The method of claim 6 wherein said diffusion phase further comprises each node that had broadcasted a modified version of said topology discovery request rebroadcasting said modified version if that node has not received an acknowledgment message within a predetermined time after having broadcast said modified version.

8. The method of claim 6 wherein said diffusion phase further comprises each of the nodes of the communication network that receive a version of said topology discovery request identifying itself as the parent of the sending node recording that sending node as its child.

9. A method carried out by a plurality of nodes of a communication network at least a portion of which is an ad hoc network in which at least some messages are communicated between originating nodes and destination nodes without being routed via any intermediate nodes, the method comprising
- carrying out an exhaustive topology discovery of at least a portion of said ad hoc network, said exhaustive topology discovery comprising discovering all of the nodes of said ad hoc network and all of the links between each pair of such nodes, there being a link between a pair of nodes whenever each node of that pair of nodes is able to receive messages from the other, said discovering including an exchange of messages among at least ones of said plurality of nodes, and
- collecting, by an individual one of the nodes of the communication network, information identifying in all of the discovered nodes and all of the discovered links
- wherein said discovering comprises a diffusion phase and a subsequent gathering phase and wherein said diffusion phase comprises
  - a) first ones of said nodes of said communication network broadcasting respective topology discovery requests,
  - b) at least a second node that receives said topology discovery requests recording each of said first nodes as its parents and broadcasting the topology discovery request received from each said first node modified to identify that node as its parent,
  - c) each of third nodes that did not receive the topology discovery requests broadcasted by the first nodes but did receive a modified version thereof broadcasted by said second node,
    - i) recording said second node as its parent and
    - ii) broadcasting said topology discovery request modified to identify said second node as its parent.

10. The method of claim 9 wherein said diffusion phase further comprises each of the nodes of the communication network that receive a version of said topology discovery request identifying itself as the parent of the sending node recording that sending node as its child.

11. A method for use by a first node of a communication network comprising a plurality of nodes, said first node being a wireless node and at least a portion of said communication network being an ad hoc network in which at least some originating and destination nodes communicate messages between one another that are not routed via any intermediate nodes, the method comprising
- receiving a request message from at least two other nodes in said ad hoc network, the request message received from each of said at least two other nodes identifying in a particular one of the nodes as being a coordinator node that originated each said request message,
- recording each said other node as concurrently being parents of said first node within a hierarchy having said coordinator at a root of said hierarchy,
- broadcasting a modified version of each received request message, said modified version identifying a respective one of said other nodes as a parent of said first node and identifying said first node as the node sending said modified version, and
- unicasting network topological information for said first node to each of said parents.

12. The method of claim 11 further comprising
receiving a version of each said request message in which said first node is identified as the parent of the node sending, that version of that request message, and recording the sending node as a child of said first node.

13. The method of claim 11 further comprising rebroadcasting of an individual one of said modified versions if said first node has not received an acknowledgement message within a predetermined time after having broadcast said individual one of said modified versions.

14. The method of claim 11 further comprising
transmitting an acknowledgment message in response to receipt of a version of a request message that had been transmitted by said first node.

15. The method of claim 11
wherein each said received request message includes a hop count and wherein said modified version of that request message includes an incremented value of said hop count.

16. A wireless node for operating within a communication network, at least a portion of said communication network being an ad hoc network in which at least some originating and destination nodes communicate messages between one another that are not routed via any intermediate nodes, the wireless node including a processor and said wireless node having stored therein instructions that, when executed by the processor, cause the wireless node to respond to receipt of a request message from at least two other nodes in said ad hoc network by
- recording each said other node as concurrently being parents of said wireless node within a hierarchy of said nodes, there being at a root of said hierarchy a particular one of the nodes that originated each said request message,
- broadcasting a modified version of each received request message, said modified version identifying a respective one of said other nodes as a parent of said wireless node and identifying said wireless node as the node sending said modified version, and
- unicasting network topological information for said wireless node to each of said parents.

17. The wireless node of claim 16 wherein said instructions further cause said wireless node to respond to receipt of a version of each said request message in which said wireless node is identified as the parent of the node sending that version of that request message by
recording the sending node as a child of said wireless node.

18. A non-transitory computer-readable medium containing computer-readable instructions to perform a method within a wireless node operating within an ad hoc network in which at least some originating and destination nodes communicate messages between one another that are not routed via any intermediate nodes, the method comprising
- receiving a request message from at least two other nodes in said ad hoc network, the request message received from each of said at least two other nodes identifying a articular one of the nodes as being a coordinator node that originated each said request message,
- recording each said other node as concurrently being parents of said wireless node within a hierarchy having at a root of said hierarchy,
- broadcasting a modified version of each received request message, said modified version identifying a respective one of said other nodes as the parent of said wireless node and identifying said wireless node as the node sending said modified version and
- unicasting network to topological information for said wireless node to each of said parents.

19. The non-transitory computer-readable medium of claim 18 wherein said method further comprise responding to receipt of a version of each said request message in which said wireless node is identified as the parent of the node sending that version of that request message by recording the sending node as a child of said wireless node.

20. The non-transitory computer-readable medium of claim 18 wherein each said received request message includes a hop count and wherein said modified version of that request message includes an incremented value of said hop count.

* * * * *